DORRANCE L. ANDERSON
ALBERT E. WILLIS
CARL E. WINKLER
JOHN M. GOULD
INVENTORS

BY

ATTORNEYS

DORRANCE L. ANDERSON
ALBERT E. WILLIS
CARL E. WINKLER
JOHN M. GOULD
INVENTORS

DORRANCE L. ANDERSON
ALBERT E. WILLIS
CARL E. WINKLER
JOHN M. GOULD
INVENTORS

United States Patent Office 3,521,143
Patented July 21, 1970

3,521,143
STATIC INVERTERS WHICH SUM A PLURALITY OF WAVES
Dorrance L. Anderson, Albert E. Willis, Carl E. Winkler, and John M. Gould, Huntsville, Ala., assignors to the United States of America as represented by the Administrator of the National Aeronautics and Space Administration
Filed June 26, 1962, Ser. No. 205,470
Int. Cl. H02m 7/52
U.S. Cl. 321—5            10 Claims The invention described herein may be manufactured and used by or for the Government of the United States of America for governmental purposes without the payment of any royalties thereon or therefor.

This invention relates to direct current to alternating current converters, or inverters as they are commonly called, and particularly to an improved static inverter of the type providing a single or multiple phase output. The uses of inverters are well known as they are employed in applications, fixed or mobile, wherever a need exists to translate direct current into alternating current.

Most multiple phase inverters, normally 3-phase, of a static type (having no moving parts), appear to follow the general type of construction and operation illustrated in Morse Re. Pat. 24,053, Skelton et al. Pat. 2,899,572 and Schmidt Pat. 2,953,735, in which the multiple phases are derived from appropriately spaced rectangular waves, one for each phase. Thus in a 3-phase system three rectangular waves are appropriately spaced 120° apart. The difficulty with this approach is the large harmonic content (distortion) of the output of such inverters, which (1) makes filtering very difficult, (2) the required circuits critical in operation, and (3) heavy filter components necessary, a very important factor where weight is critical, such as in aircraft or space vehicles (perhaps the largest users of inverters). The unfiltered harmonics which the inverter filters must combat often total in excess of 50% of the amplitude of the frequency of the inverter. In order to meet such high harmonic distortion conditions and reduce the harmonic content to acceptable limits, which for many applications is on the order of 5%, design requirements are very rigid. This is particularly so where load and/or power factors vary. Such changes often allow transients, overshoots in the electrical rectangular wave forms involved, of sufficient amplitude to completely destroy transistor switches which are customarily employed to switch the electrical wave forms involved.

It is, accordingly, a prime object of this invention to provide an improved inverter which overcomes the aforesaid formidable difficulties.

It is a further object of this invention to achieve an improved inverter that is inherently stable, reliable, efficient and adapted in design to packaging in varied environments in which inverters are required to operate.

In accordance with the invention a multiple-phase (a single-phase output is also available) static inverter is constructed in which the rectangular waves referred to above are replaced by stepped waves through novel means, resulting in the substantial elimination of the filter problem and achieving significant reductions in weight and substantial improvements in reliability. An inverter of this invention is briefly described as follows. A frequency standard, a very accurate source of alternating current, is employed to generate a multiple of the desired inverter output frequency. An example would be a crystal controlled oscillator operating at 57.6 kilocycles (kc.). The output of this oscillator is divided down by conventional means to a lower multiple of the inverter output frequency and feeds pulses to a digital circuit which in turn develops a plurality of pulse wave trains at the desired inverter frequency with succeeding waves differing in time by a factor equal to 180°/N where N is equal to the number of wave trains. The output of the binary circuit, the plurality of wave trains, is then fed to N output voltage coding circuits. Each of these coding circuits in response to its square wave input provides a number of different coded outputs equal in number to the number of output phases. For example, in a 3-phase inverter, each coding means will provide three rectangular wave outputs. One output from each coding means is combined to produce one phase of the inverter alternating current, approximate sine wave, output, and the outputs are chosen to achieve a selection of amplitudes which are graduated in a periodic manner. The coding of each of the outputs thus combined is of a value to provide a stepped output waveform containing in each step the approximate area of that portion of the sine wave of the inverter frequency coincident with the time duration of that step. In a like manner adjusted outputs are combined to form the other output phases of the inverter.

Techniques such as merely amplifying up from subcircuits to significant power output levels three sine waves or stepped waves ("Design Techniques for Static Inverters," A. Sorenson, Electrical Manufacturing, February 1960, p. 91) of appropriate phase to achieve a 3-phase output were discarded due to the inherent inefficiency and heat dissipation problems involved in operating the amplifying devices, normally silicon power transistors, in other than an on-off switching mode.

The features of our invention which are believed to be novel are defined with particularity in the claims. The invention itself, both as to its organization and method of operation, together with further objects and advantages thereof, may be best understood by reference to the following description considered in conjunction with the accompanying drawings in which:

Figures 1, 2:
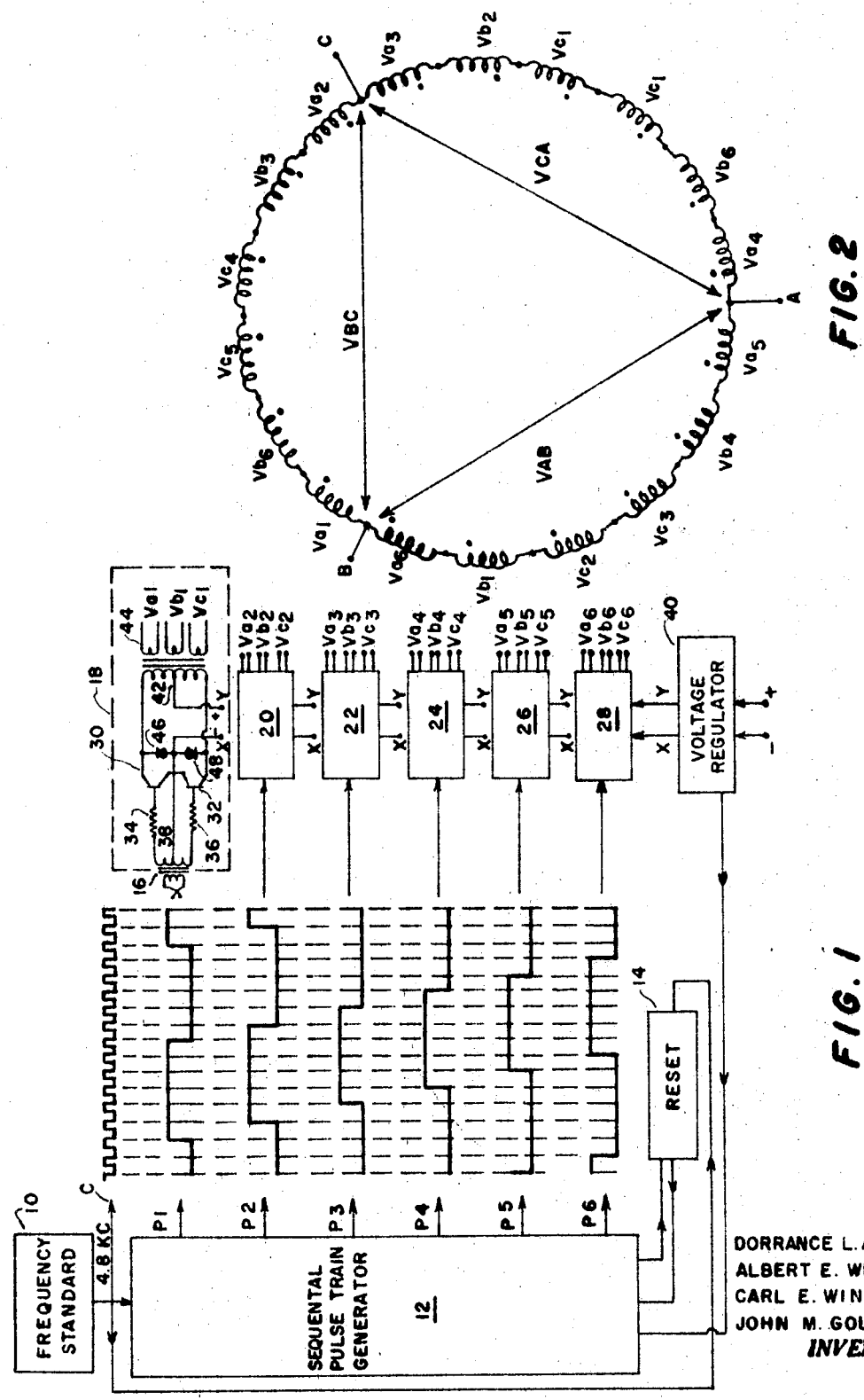
FIG. 1 is an electrical schematic diagram of a major portion of an embodiment of the invention.
FIG. 2 is a wiring diagram of the output windings of voltage coding circuits employed with FIG. 1 and completes the overall diagram of an embodiment of the invention.

Referring now to FIG. 1 there is shown an overall electrical diagram of an embodiment of the invention. A frequency standard 10 which has a crystal oscillator frequency of 57.6 kc. and a frequency divider, countdown circuitry, of a standard type, provides an output frequency of 4.8 kc. The 4.8 kc. signal is then fed to sequential pulse wave train converter or generator 12 and corrective reset circuit 14 which are shown in detail in FIG. 4. The converter 12 provides substantially square or rectangular wave train outputs P1, (Phase 1) through P6 (Phase 6) as illustrated by the output waveforms or wave trains appearing opposite terminals corresponding to these designations. Succeeding square waves (e.g. P2 succeeds P1) commence at 30° intervals, 180°/N wherein the number of waveforms is equal to 6, all occurring at the same rate. Three output phases are obtained and thus N is two times the number of phases. Here this rate is 400 c.p.s., the most common 3-phase frequency. Each of the wave or pulse trains is individually amplified in pulse train generator 12 to provide control voltages which are applied, respectively, to each input transformer 16 of each of the voltage coding circuits 18, 20, 22, 24, 26, and 28, only one of which, coding circuit 18, is shown in detail since all are identical.

Coding circuit 18 consists basically of a common emitter push-pull square wave amplifier in which the secondary of input transformer 16 is connected between the base input of NPN power transistors (e.g. 2N1016) 30 and 32 through resistors 34 and 36 which serve to limit and stabilize the input current. The common emitters connect to a center tap 38 on input transformer 16 and to a common negative terminal of voltage regulator 40, which, shown in detail in FIG. 5, serves to assure a collector voltage source which will provide a constant inverter output. A positive voltage is available at the Y output terminal of voltage regulator 40 and it is fed through the center tap 42 of the primary of output transformer 44 to the collectors of transistors 30 and 32. Commutating diodes 46 and 48 are connected anode to anode (of the diodes) from collector to collector of the transistors with the diode anodes connected to the transistor emitters. These diodes serve to pass reverse currents and, thus, are a protective measure for the transistors in instances where reactive loads are present. The output side of transformer 44 has three secondaries labeled $V_{a1}$ $V_{b1}$ and $V_{c1}$ in terms of the voltage coding assigned each ($a$, $b$ or $c$) secondary and the assigned phase (in the case of coding circuit 18 it is 1).

Figure 3:
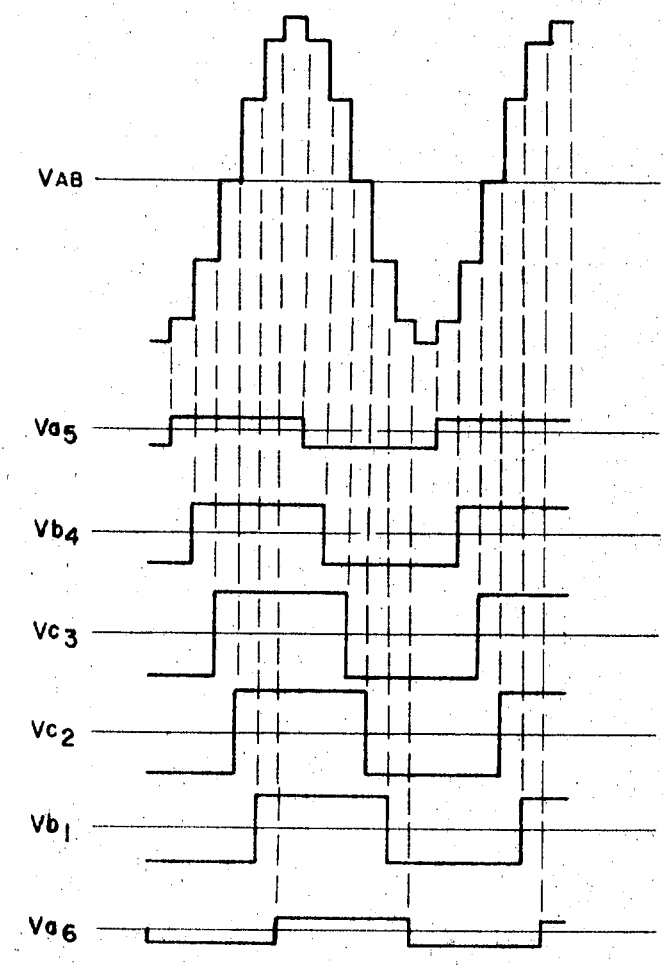
FIG. 3 is a graphic illustration of one phase of an output of the circuit set forth in FIG. 1.

The codings are adjusted or fixed to achieve the correct summation of the stepped wave illustrated in FIG. 3, the three codings of each of the coding circuits being identical as between respective coding circuits. They are best illustrated by assuming a value of unity for $V_a$ and then $V_b$ is fixed at a value $V_a(\sqrt{3}+1)$ and $V_c$ at a value $V_a(\sqrt{3}+2)$. These codings which are graduated and approximately follow an arithmetic progression are achieved by an appropriate number of turns making up each transformer secondary in a standard manner. All transformer secondaries from all coding circuits are interconnected as illustrated in FIG. 2 in order to achieve the three output phases with a 3-phased 400 cycle output at terminals A, B and C.

FIG. 3 illustrates an example of how one of the phases, $V_{AB}$, is formed by the summation of the transformer secondaries $V_{a5}+V_{b4}+V_{c3}+V_{c2}+V_{b1}+V_{a6}$; $V_{BC}$ is similarly constructed by the summation $$V_{a1}+V_{b6}+V_{c5}+V_{c4}+V_{b3}+V_{a2}$$

and $V_{CA}$ achieved from the summation $$V_{a3}+V_{b2}+V_{c1}+V_{c6}+V_{b5}+V_{a4}$$

Each summation is of a gradually varying in amplitude group of pulses where the sequence in variation in amplitudes in periodic.

A significant problem in the evolution of this invention was that of finding a simple but reliable means for generating the six phased wave trains illustrated in FIG. 1. Finally it was discovered that an answer lay in the circuit illustrated in FIG. 4. While this circuit, which we refer to as sequential pulse train generator 12, resembles generally what is referred to as a shift register as it employs a series of flip-flop switching circuits having shift register type input connections, it has unique means for recycling to achieve the continuous sets of pulse trains illustrated and a unique reset circuit insuring accuracy.

Figure 4:
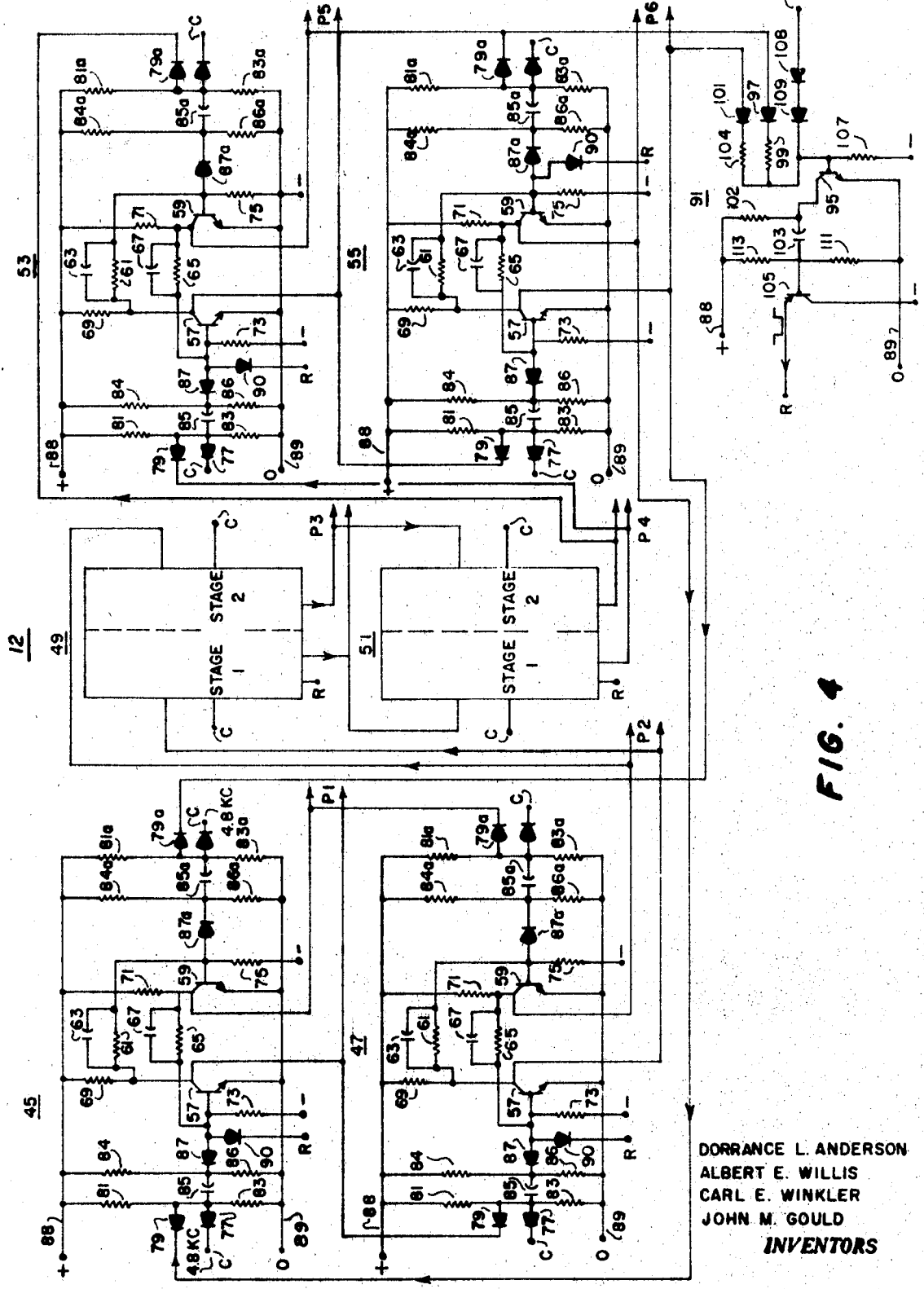
FIG. 4 is a schematic circuit diagram of the sequential pulse generator shown in block form in FIG. 1.

Considering now FIG. 4, it will be noted that the sequential wave train generator 12, contains six bi-stable switching circuits.

Bi-stable switching circuits 45, 47, 49, 51, 53 and 55 are identical to the extent indicated above with each switching circuit containing two amplifier stages forming a direct current coupled multi-vibrator capable of retaining the conductive state of either the first stage transistor 57 or the second stage transistor 59 until a conducting transistor is keyed "off" by an "off" pulse, in this instance a negative pulse as both transistors 57 and 59 (e.g. 2N718A) are of the NPN type.

To examine one of the switching circuits, as for example switching circuit 45, the collector of transistor 57 is coupled to the base of transistor 59 by resistor 61 paralleled by by-pass or accelerating capacitor 63; similarly, the collector of transistor 59 is coupled to the base of transistor 57 by resistor 65 paralleled by capacitor 67. Resistor 69 provides an output load for transistor 57 and resistor 71 provides an output load for transistor 59. A reverse bias of approximately 5.5 volts (source not shown but obtainable as a rectified and regulated output of an additional winding on transformer 140 in FIG. 5) is applied through input resistor 73 between the base and emitter of transistor 57 and in a like manner through input resistor 75 to transistor 59.

Additionally, the input circuitry of each transistor contains an identical input logic circuit which functions to allow a triggering pulse to be applied to the flip-flop stage which will appropriately shift operating stages between electrically adjacent, or succeeding switching circuits, when a preceding keying stake is "off" and an input clock pulse C (4.8 kc.) pulse completes a cycle (with a return to zero) during this "off" period. To examine this input circuitry more closely, the left flip-flop or bistale stage, the one including transistor 57, has two input diodes, diode 77 and diode 79, the positive terminals of which connect to a common terminal of resistors 81 and 83 and one terminal of input capacitor 85. The clock pulses C, which are positive pulses having an amplitude of approximately 10 volts, are applied to the negative terminal of diode 77. The negative terminal of diode 79 is connected to the output of a preceding stage in a manner which will be described below. The left bistable stage input circuitry is completed by connecting the free terminal of capacitor 85 to a common terminal of resistors 84 and 86 and through diode 87 to the base input of transistor 57. The free terminals of resistors 81 and 84 connect to common supply terminal 88 and the free terminals of resistors 83 and 86 connect to common zero voltage terminal 89. In addition the left bistable stages of switching circuits 45, 47, 49, 51 and 53 contain a series connected diode 90 interconnecting the base of transistor 57 with the reset output R of reset circuit 91. Diode 90 is appropriately poled to pass the negative output of reset circuit 91 which is developed in a manner to be described. Diode 92 is similarly connected to the base input of transistor 59 of switching circuit 55.

The input circuitry of the right side bistable stages is identical to that of the left side just described with the exception of the reset circuitry in the case of switching circuit 55, as explained above. In view of the identity of circuitry the counterpart elements not otherwise identified in the right side bistable stage are designated by the addition of the letter $a$ to each reference numeral and thus their description is not repeated here.

Considering now the interswitching circuit connections it will be observed that the interconnections between succeeding switching circuits follow the pattern of the output (collector) of transistor 57 in one stage being coupled to the input (base) of the corresponding transistor 57 (left to left) in the next stage (likewise transistors 59 to 59 are so connected) except that the outputs from switching circuit 55 are cross coupled (left to right and right to left to the input of switching circuit 45).

Reset switching circuit 91 includes input logic circuit 93 which receives the 4.8 kc. positive clock pulses $c$ from frequency standard 10 (FIG. 1) and samples the output of the right stage of switching circuit 53 and left stage of switching circuit 55. The 4.8 kc. clock pulses are applied to the base of transistor 95 (e.g. 2N718A) through forward poled diodes 108 and 109. The output of switching circuit 53 is connected from the collector of transistor 59 through diode 97 and resistor 99 to the base of transistor 95 and an output of switching circuit 55 is connected from transistor 57 through diode 101 and resistor 103 to the base of transistor 95. Both diodes 97 and 101 are poled to pass the positive going voltages which are impressed across them by virtue of these interconnections. The output of transistor 95 is coupled through capacitor 103 to PNP transistor 105 connected as an emitter follower. The output of transistor emitter follower 105, which is the output R of reset circuit 91, is coupled in the manner stated above through diode 90 to the input of transistors 57 of switching circuits 45, 47, 49, 51 and 53.

To consider the operation of the sequential pulse train generator 12 and reset circuit 14 shown in FIG. 4, observe first that positive polarity rectangular wave clock pulses c at the rate of 4.8 kc. of an amplitude of approximately 10 volts are being applied to the input, negative, terminal of diodes 77 and 77a of each switching circuit. Then assume that the state of switching circuit 45 is such that transistor 57 is conducting and is at a saturated state with the voltage at its collector near zero. Looking at the output waveform P1 in FIG. 1 of switching circuit 45, this voltage is represented by the initial, lower, voltage position of the waveform (the output waveforms P1–P6 are with respect to the collector of transistors 57 of the respective switching circuits). At the same time it will be observed that the waveform output P6 of switching circuit 55 is also at a zero value, representing that transistor 57 of switching circuit 55 is also saturated. In accordance with the nature of each switching circuit, a bistable multi-vibrator or flip-flop, the collector of transistor 59, the opposite stage of switching circuit 55 is at a maximum positive value as transistor 59 is cut off. Due to the cross coupling between switching circuits 55 and 45 this maximum positive voltage from transistor 59 is applied to the negative input of diode 79 of switching circuit 45. This holds diode 79 in a cut-off condition and the input circuit to transistor 57 is controlled solely by the positive clock pulses c which react as follows. During the positive portion of a clock pulse, diode 77 is also blocked. With the input circuit thus in an open condition and because of the relative values of resistors 81 (e.g. 8.2K ohms), resistor 83 (e.g. 3.6K ohms), 84 (e.g. 4.7K ohms) and 86 (e.g. 2.2K ohms) forming voltage dividers on each side of capacitor 85, approximately 10 volts develops across the capacitor with the right terminal of capacitor being of the lower potential, thus negative potential, with respect to the left terminal. Next, the clock pulse falls to zero, completing a first clock pulse, and diode 77 conducts, essentially moving the left terminal of capacitor 85 to ground which places a negative voltage of approximately 10 volts at the negative terminal of diode 87, with respect to the zero or common ground terminal 89. This produces current flow through diode 87 and places a cut-off signal on transistor 57 which, due to regenerative nature of the switching circuit, as mentioned above, causes switching circuit 45 to reverse conduction stages and transistor 57 to cut "off" and transistor 59 to turn "on." In this manner the voltage at the collector of transistor 57 rises to produce the rising or leading edge P1. Following this event the excitation and relation of currents between the output of transistor 57 of switching circuit 47 are identical to the excitation and relation which previously existed between the cross coupled output of transistor 59 of switching circuit 55 and the input of switching circuit 45 with the result that after a second complete cycle of the clock pulse, switching circuit 47 switches conduction states to produce the leading edge of P2.

This process continues between successive switching circuits with each cycle of the clock pulse until switching circuit 53, the next to the last switching circuit, is switched to produce the leading edge of P5. At this point the reset circuit 91 performs its function to insure that the circuit is functioning properly, that is to assure that transistors 57 of switching circuits 45, 47, 49, 51 and 53 are in an "off" state and transistor 57 of switching circuit 55 is in an "on" state.

To examine the operation of the reset circuit it will be noted that prior to the last mentioned switching action, transistor 59 of switching circuit 53 was in an "off" or maximum positive voltage output state and this positive voltage was applied as a first sample voltage to reset circuit 91 across the series connected combination of diode 97, resistor 99, and resistor 107. Resistor 107 provides an input impedance through which a reverse bias is applied between the base and emitter of transistor 95. The effect of the positive voltage from switching circuit 53 is to overcome the negative bias, approximately 5.5 volts, and thus hold the collector voltage of transistor saturated 95, at a near zero voltage, preventing capacitor 103 in the output circuit of transistor 95 from becoming charged and thus developing a reset voltage prior to this instance. The second sample input to reset circuit 91 is from the collector of transistor 57 of switching circuit 55 and the voltage at this collector is near zero leaving a blocking path through diode 101 in resistor 103 of reset circuit 91 which does not affect the circuit. Likewise, since the input from transistor 59 of switching circuit 53 already has produced saturation in transistor 95 the zero to positive clock pulses through diodes 108 and 109 had no new effect.

One of the diodes, 108 or 109, which are in series, is of a very high speed type such as a 1N916 to reduce capacity effects provided by the diodes in this path and prevents faulty switching due to storage of energy. The two diodes in series are used in order to insure that the clock pulse drive voltage at its lowest point still does not provide a conductive potential and apply a gating voltage to transistor 95 at an improper time.

To examine the output circuit of transistor 95, the right terminal of capacitor 103 and the collector of transistor 95 are connected to a positive source by resistor 102 (e.g. 3.6K ohms) which provides a charging path for capacitor 103 through resistor 111, the path being between the positive source terminal 88 and the zero terminal 89 of the source voltage applied to reset circuit 91. Resistor 113 (e.g. 47K ohms) coupled between the positive terminal 88 and the left terminal of capacitor 103 and resistor 111 (e.g. 3.6K ohms) coupled between the same terminal and the zero terminal 89 provide a voltage divider which normally holds the voltage at the left terminal of capacitor 103 to a very low value.

With the application of the next clock pulse to the input of switching circuit 53, and the switching to an "off" condition of transistor 57 (as this next clock pulse falls to zero) an "on" or zero voltage from the collector of transistor 59 is applied to diode 101 and a now unopposed reverse emitter base bias is applied to transistor 95 to turn it off. This allows capacitor 103 to charge to approximately 20 volts, with the left terminal being negative with respect to the right terminal. Following the charge of capacitor 103, which occurred during the half cycle when the clock pulse was zero, the clock pulse rises and transistor 95 conducts pulling the right terminal of capacitor 104 to ground. The result is that a negative pulse is applied to the input of emitter follower 105 and thence as a negative corrective or reset pulse from the output of emitter follower 105 to the input of transistors 57 of switching circuits 45, 47, 49, 51 and 53 and to the input of transistor 59 of switching circuit 55. This insures at this point of operation that the left side of the first five stages are in an "off" condition and the left side of the last stage is in an "on" condition. It is a feature of this invention that reset is accomplished in this manner and with this timing which is not coincidental with any other switching action of generator 12 insuring that the corrective effect, if needed, will not be nullified by negative feedback in the form of incorrect switching at some other point in the circuit.

With the occurrence of the next, sixth, switching pulse transistor 57 of switching circuit 55 forms, as illustrated in FIG. 1, the leading edge of P6 thus completing the initiation of the six pulse wave trains. Thereafter, in accordance with the invention, recycling of the pulse train generator is achieved to form the trailing edges of each phase by cross coupling the interconnections of switching circuits 55 and 45, with the output of transistor 57 of switching circuit 55 being coupled to the input of transistor 59 of switching circuit 45.

To illustrate the operation, observe that the "off" maximum value potential of switching circuit 55, appearing at the collector of transistor 57, is coupled to the negative input of diode 79a of switching circuit 45 feeding transistor 59. As a result diode 79a is blocked as is diode 77a during the positive excursion of the clock pulse in the half cycle preceding the point of switching. In this mode capacitor 85a of switching circuit 45 is charged by the supply voltage to the polarity indicated. Now when the clock pulse drops to near zero the right terminal of capacitor 85a likewise drops, as previously explained, and the negative (turn-off) switching potential is applied to the base of transistor 59 turning it off. This of course has the opposite effect on transistor 57 of switching circuit 45 as the output of transistor 59 applies a turn-on potential to the base input of transistor 57. This action is reflected by the trailing edge of P1. In a like manner the switching action continues down the right-hand transistors as it did down the left-hand transistors to achieve successive trailing edges of the pulse trains P1 through P6 to complete the formation of the first pulse of each phase. At the conclusion of the first series of pulses the action is repeated due to the cross coupling which indicates switching down the left side of the switching circuits again.

Figure 5:
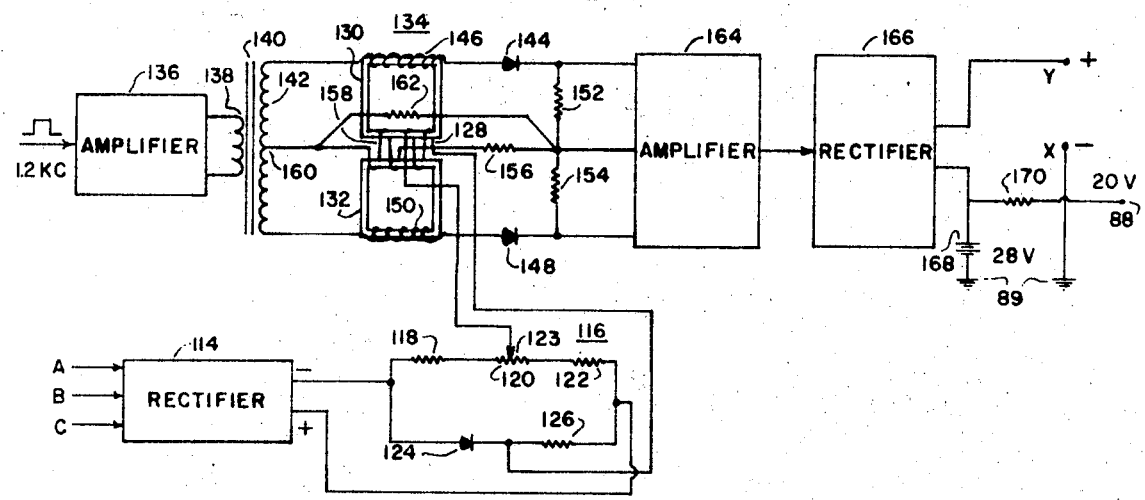
FIG. 5 is a schematic wiring diagram of the voltage regulator circuit set forth as a block diagram in FIG. 1.

Constant output voltage of the inverter of this invention is maintained by means of novel voltage regulation circuitry set forth in detail in FIG. 5 which provides a variable voltage boost. The 3-phase output of the inverter, appearing at terminals A, B, and C is applied to the input of 3-phase rectifier 114 connected to provide a direct current voltage varying directly as the amplitude of the 3-phase varies. This direct current output is then applied across Zener diode bridge circuit 116 consisting basically of two current paths. The first current path is formed by resistor 118 (e.g. 700 ohms) in series with potentiometer 120 (e.g. 500 ohms) and resistor 122 (e.g. 15K ohms). The second current path consists of Zener diode 124 (e.g. 1N509) in series with resistor 126 (e.g. 15K ohms). The output current of Zener bridge circuit 116 is taken off between the variable tap 123 of potentiometer 120 and the interconnection between diode 124 and resistor 126 and flows through flux bias winding 128 wound on magnetic cores 130 and 132 of magnetic pulse width modulator 134. The variable tap serves to allow adjustment of the control current in winding 128 producing a variable flux bias which opposes a square wave input of 1.2 kc. to magnetic cores 130 and 132. The square wave input to modulator 128 is obtained for example, from frequency standard 10, as by further division the 4.8 kc. signal, or from a separate oscillator. This square wave signal is amplified in amplifier 136 and fed to the primary of winding 138 of transformer 140. A balanced secondary winding 142 of transformer 140 is connected in the form of a full wave rectifying circuit through magnetic modulator 134 with core 130 energized, or gated, to saturation with one-half cycle through energizing winding 146 on core 130 and through rectifier 144. Core 132 is similarly gated on the other half cycle by a pulse through energizing winding 150 on core 132 and through rectifier 148. Resistor 152 is in the first leg or phase of the rectifier circuit and thus across which appears one polarity of pulse output as width modulated by winding 146. Resistor 154 is in the other leg of the rectifier circuit and across it appears the opposite polarity pulse output as width modulated by winding 150. Together, resistors 152 and 154, which are brought to a common connection, provide the alternating current pulse output of secondary winding 142 as pulse width modulated by magnetic modulator 134. From the common connection between resistors 152 and 154 there is a full wave rectified current flow through current limiting resistor 156 and positive magnetic feedback winding 158 common to cores 130 and 132 back to a center tap 160 of winding 142. Resistor 162 is connected in parallel across the series circuit of resistor 156 and feedback winding 158 and is of a value to appropriately divide the current between winding 158 and resistor 162 to obtain the desired level of positive feedback and thus desired rate of response. As indicated above, the output of the Zener bridge circuit 116 feeds winding 128, and it in turn opposes the flux created by current flow through windings 146, 150 and 158. The output of modulator 134 appears, as indicated across resistors 152 and 154 and is fed to current amplifier 164 and then to rectifier 166 in which the output of amplifier 164 is rectified and filtered to provide a direct current variable boost voltage which, as indicated, is added to the voltage output (e.g. 28 volts) of battery 168. This combined output which forms regulated output is then provided, as shown in FIG. 1, to the collector circuits of transistors 30 and 32 of coding circuits 18, 20, 22, 24, 26 and 28. An unregulated source of 20 volts positive for the collectors of transistors 57, 59 and 95 is obtainable through resistor 170 connected to the positive terminal of battery 168.

Figure 6:
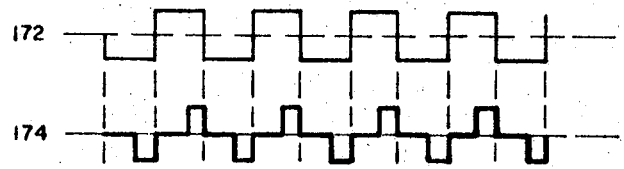
FIG. 6 is a graphic illustration of an operating characteristic of the voltage regulator shown in FIG. 5.

The amount of voltage boost provided by the output of rectifier 166 to achieve a constant inverter output is determined as follows. With a given output load on the output of the inverter (connected to terminals A, B and C of FIG. 2) the center tap 123 of potentiometer 120 is adjusted to provide the degree of biasing current to magnetic modulator winding 128 which will provide the desired alternating current output at terminals A, B and C. Referring to FIG. 6, assume that with an output from the secondary winding 142 of transformer 140 corresponding to the square wave train 172 that the desired value of inverter output is achieved with a biasing value which delays saturation and thus output current rise, for approximately half the period of each half cycle as illustrated by the output of modulator 134 shown in modulated wave train 174. If the output voltage of the inverter decreases, this decrease will be sensed by bridge circuit 116 and the control current through winding 128 will decrease, allowing cores 130 and 132 to saturate sooner and the period of each output pulse will expand. Accordingly, the filtered output of rectifier 166 will increase because of the higher average value of the output and the total output available at terminals X and Y which supply coding circuits 18, 20, 22, 24, 26 and 28 will increase to provide a compensating increase which will cancel out the inverter voltage output decrease and thus maintain a constant inverter output. If the converse occurs and the voltage at terminals A, B and C increases, the effect will be to increase the negative effect flux bias in cores 130 and 132 with the result that the output pulses of magnetic modulator 134 will become narrower and the output of rectifier 166 in turn will be reduced to return the inverter output voltage to its original setting. These compensating effects of course occur nearly instantaneously with the result that the voltage output of the inverter at terminals A, B and C remains essentially constant. Regulation is achieved very efficiently since only a boost voltage is regulated which, it has been found, works well in many applications where the boost is only about one-fourth of the total output voltage.

Considering now the inverter of this invention as a whole, it is first to be noted that its harmonic products are reduced substantially in a workable and effective manner. The first harmonic that occurs is one less than the total steps in a complete cycle. Thus with 12 steps as illu:strated in FIG. 3 the first harmonic is the 11th or 4400 cycles in the case of a 400 cycle fundamental frequency. The amplitude of the first harmonic is similarly computed as being one-eleventh the amplitude of the fundamental. The next harmonic is one more than the number of steps, or the 13th harmonic and its amplitude is one-thirteenth the amplitude of the fundamental. The remaining harmonics occur at other step multiples ±1. The total harmonic content for the 12-step case has been computed at approximately 15%. This is in contrast to several times this percent with the one step case of the prior art, and of course the harmonics generated in the one-step case are a much lower frequency and thus much harder to filter. It has been found that the filter problem in a case of the inverter described herein is slight in that the first harmonic that it must deal with is 4400 cycles and in many applications slight inductive loads result in essentially pure sine wave output without any filtering elements being provided to eliminate the harmonics. Distortion levels below 5% are readily obtainable by simple L-C type filters (not shown) tuned to the inverter frequency.

Stability and reliability of operation have been achieved in the invention by an effective combination of elements and operation which include pulse train generator 12 as automatically corrected by reset circuit 91, the boost voltage regulator 40, and the operation of power transistors 30 and 32 of voltage coding circuit in an off-on switching mode.

It will be readily appreciated that embodiments of the invention may be compactly packaged, using for example micro-module switching circuits in pulse train generator 12 and small, if any, output filtering networks. For this reason the inverter is well adapted for aircraft or space vehicles. It, of course, is also adapted for other applications which range from military land vehicles to laboratory standards in view of the fact that the placement, mounting and selection of parts is not generally critical. Power output is only limited by the heat dissipation capabilities of power transistors 30 and 32, and, as in the mode of operation employed here operating efficiencies of 89 to 92% are obtained, relatively high outputs are available from a given type transistor.

The overall efficiency of an inverter constructed in accordance with the invention will be approximately 80%. This is in contrast to the efficiency of 40 to 50% for electromechanical type inverters which are generally being employed today in aircraft and space vehicles.

While there has been described what at present is considered a preferred embodiment of the invention, it will be obvious to those skilled in the art that various substitutions of elements and modifications and interconnections of these elements may be made without departing from the invention, and it is aimed in the appended claims to cover all such changes and modifications disclosed that are within the true spirit and scope of the invention.

What is claimed is:

1. A static inverter comprising:
   (A) pulse generating means for generating a wave train of electrical pulses at a first frequency;
   (B) a sequential pulse train generator responsive to said generating means for providing a plurality, N, of pulse wave trains differing in time by a factor of 180°/N with the time reference being at a second frequency, the output frequency of the inverter;
   (C) N output voltage coding means,
      (1) each of said coding means being responsive to separate and single pulse wave trains from said pulse train generator and an input direct current supply voltage for developing an alternating current rectangular wave voltage for each phase of the output of said inverter and having a duration corresponding to pulses of said pulse wave train of said pulse wave train generator,
      (2) the amplitudes of said rectangular wave voltages being adjusted to make available as a sum of one voltage from each coding means, when like polarities are added, a voltage equal to the maximum voltage of an output phase;
   (D) summing means for each output phase for combining one voltage output from each coding means to provide a single phase output.

2. The inverter set forth in claim 1 wherein the number of output phases is three, and
   (A) each coding means develops a plurality of graduated voltages,
   (B) further comprises phase combining means for intercoupling said voltages to provide successive phased stepped waves approximating sine waves.

3. The inverter set forth in claim 2 wherein said sequential pulse train generator comprises an N number of bistable stages each having a shift register input circuit and plural outputs, and wherein plural output interstage coupling, except from the last stage to the first stage, follows a like phase coupling pattern, and the last stage to the first stage follows a cross coupling pattern.

4. The inverter set forth in claim 3 wherein:
   (A) N equals six;
   (B) each said coding means develops three said graduated voltages;
   (C) each said summing means combines two of each of the three levels of graduated voltages.

5. The inverter set forth in claim 4 wherein:
   (A) each said summing means comprises electrical connections for combining said six graduated voltages in such an order that, at one point in time, said summing means combines one each of said three levels of graduated voltages having a positive potential and one each of said three levels of voltages having a negative potential, thereby producing a point on each one of said phased stepped waves where a step of said stepped output wave is of zero voltage level and said stepped output wave is changing in a positive direction;
   (B) said electrical connections being arranged so that, taking the beginning of said step of zero voltage level on said stepped output wave as a reference point, said six graduated voltages are summed, as they change polarity in succession at 30° intervals from said reference point, as follows:
      (1) a first maximum-level voltage changing from negative to positive;
      (2) a first intermediate-level voltage changing from negative to positive;
      (3) a first low-level voltage changing from negative to positive;
      (4) a second low-level voltage changing from positive to negative;
      (5) a second intermediate-level voltage changing from positive to negative;
      (6) a second maximum-level voltage changing from positive to negative.

6. The inverter set forth in claim 3 wherein:
   (A) each said bistable stage comprises first and second amplifiers connected as a direct coupled multi-vibrator;
   (B) said inverter further comprises reset means responsive to the same condition from opposite outputs of two successive said bistable stages and said pulse generating means for developing a reset voltage between the time of occurrence of sequential pulse switching between said successive stages of said pulse train generator;
   (C) further comprises coupling means for applying said reset voltage in a phase to the input of an amplifier in each stage which is in phase with the correct condition of that amplifier.

7. The inverter set forth in claim 6 wherein:
   (A) said reset means comprises an amplifier biased unresponsive to input signals except during a period when said outputs from said bi-stable stages are both in a first condition;
   (B) said pulse generating means has an output frequency equal to 2N times the inverter output frequency, providing one complete cycle between successive pulse wave trains, (C) said reset amplifier comprises means responsive during said excepted period to the output of said generating means for causing said reset amplifier to change states during the half cycle of the pulse generating means output following an intercircuit switching change;

(D) means, including a capacitor, responsive to the output of said reset amplifier for charging said capacitor during said half-cycle;

(E) means responsive to a change in potential following said half-cycle to couple a pulse responsive to the charged said capacitor to provide said reset voltage.

8. The inverter set forth in claim 7 further comprising voltage boost power regulation means and said regulation means in turn comprising:

(A) sensing means responsive to the output of said inverter for deriving a current which varies directly with the variation in amplitude of said inverter output;

(B) magnetic pulse width modulation means having first and second magnetic cores;
  (1) a first winding on said first core,
  (2) a second winding on said second core,
  (3) third and fourth windings being coupled to both said cores;

(C) a balanced source of alternating current input having first and second and third output terminals, said first and second output terminals providing opposite phase outputs with respect to said third terminal;

(D) a first resistor and first diode being connected in a first series circuit with said first winding between said first terminal and a common point;

(E) a second resistor and second diode being connected in series with said second winding between said second terminal and said common point;

(F) said third winding being connected in circuit between said common point and said third terminal;

(G) said fourth winding being energized by said current derived by said sensing means;

(H) said diodes and said first, second, third and fourth windings being poled to provide alternate cycle current flow through said diodes and to provide opposite flux effects in said cores by said fourth winding with respect to that produced by said first, second and third windings;

(I) signal means responsive to the alternating current output of combined opposite half-cycle outputs across said first and second resistors for providing a direct current voltage which varies directly with the width of the half-cycle outputs of said resistors;

(J) means responsive to the direct current output of said signal means and a direct current supply voltage source for providing a sum voltage of said last named output and voltage source to said coding means as said input direct current supply voltage.

9. A static inverter comprising:

(A) pulse generating means for generating a wave train of electrical pulses at a first frequency;

(B) a sequential pulse train generator responsive to said generating means for providing a plurality, N, of pulse wave trains differing in time by a factor of $180°/N$ with the time reference being at a second frequency, the output of frequency of the inverter;

(C) amplitude coded pulse power output means responsive to each said pulse train for providing a plurality of power output pulses of graduated amplitude for each received pulse;

(D) summing means for each desired phase output responsive to each said power output means for selectively combining in a periodic sequence selected said power output pulses.

10. The inverter set forth in claim 9 wherein said power output means includes electronic switching means operated in an on-off switching mode, switching a direct current input to provide the output power of said pulse power output means.

References Cited

UNITED STATES PATENTS

| | | | |
|---|---|---|---|
| 2,899,572 | 8/1959 | Skelton et al. | 321—6 X |
| 3,181,053 | 4/1965 | Amato | 321—45 |
| 3,210,638 | 10/1965 | Walker | 321—45 X |
| 3,304,484 | 2/1967 | Kernick et al. | 321—5 |
| 3,052,833 | 9/1962 | Coolidge | 321—5 |

OTHER REFERENCES

Electronic Equipment Engineering: May 1960, "Synchronized Inverter Has 3-Phase Output," pp. 18 and 19.

Electronics: July 8, 1960, "State Inverter Delivers Regulated 3-Phase Power," pp. 55–59.

J D MILLER, Primary Examiner

G. GOLDBERG, Assistant Examiner

U.S. Cl. X.R.

307—223, 296; 321—18, 27

UNITED STATES PATENT OFFICE
CERTIFICATE OF CORRECTION

Patent No. 3,521,143            July 21, 1970

Dorrance L. Anderson et al.

It is certified that error appears in the above identified patent and that said Letters Patent are hereby corrected as shown below:

Column 3, line 32, "$\sqrt{a}\ (\sqrt{3+1}$" should read -- $\sqrt{a}\ (\sqrt{3}+1)$ --;

same column 3, line 33, "$\sqrt{a}\ (\sqrt{3+2}$" should read -- $\sqrt{a}\ (\sqrt{3}+2)$ --.

Signed and sealed this 23rd day of February 1971.

(SEAL)
Attest:

Edward M. Fletcher, Jr.            WILLIAM E. SCHUYLER, JR.
Attesting Officer                       Commissioner of Patents